United States Patent
Digangi et al.

(10) Patent No.: US 11,373,239 B1
(45) Date of Patent: Jun. 28, 2022

(54) REAL-TIME CURRENCY EXCHANGE SYSTEM

(71) Applicant: Wells Fargo Bank, N.A., San Francisco, CA (US)

(72) Inventors: Frank Digangi, San Francisco, CA (US); Carrie Anne Hanson, Charlotte, NC (US); Jonathan Austin Hartsell, Mooresville, NC (US); Daniel Sanford, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/039,382

(22) Filed: Sep. 30, 2020

(51) Int. Cl.
*G06Q 40/04* (2012.01)
*G06Q 20/20* (2012.01)
(Continued)

(52) U.S. Cl.
CPC ......... *G06Q 40/04* (2013.01); *G01C 21/3811* (2020.08); *G01C 21/3885* (2020.08);
(Continued)

(58) Field of Classification Search
CPC .... G06Q 40/04; G06Q 20/202; G06Q 20/206; G06Q 20/383; G06Q 20/40145; G06Q 30/0185; G06Q 30/08; G01C 21/3811; G01C 21/3885; G06F 16/90335; G07C 9/00563; G06V 40/70
See application file for complete search history.

(56) References Cited

U.S. PATENT DOCUMENTS

| 7,229,011 B2 | 6/2007 | Hansen et al. |
| 7,783,571 B2 * | 8/2010 | Fish ........................ G06Q 40/00 705/43 |

(Continued)

FOREIGN PATENT DOCUMENTS

| WO | WO-0175658 A2 * | 10/2001 | ............. G06Q 40/04 |

OTHER PUBLICATIONS

Zaleski, "A start-up that wants to make ATMs obsolete" (accessed at: https://www.cnbc.com/2014/11/07/a-start-up-that-wants-to-make-atms-obsolete.html), Nov. 7, 2014.

*Primary Examiner* — Ashford S Hayles
(74) *Attorney, Agent, or Firm* — Foley & Lardner LLP

(57) ABSTRACT

A system includes a network interface circuit and a processing circuit configured to receive a physical currency transaction request from a first user device, the physical currency transaction request including a currency exchange transaction parameter, match the physical currency transaction request to another physical currency transaction request based at least in part on the currency exchange transaction parameter, provide the physical currency transaction request to a second user device associated with the another physical currency transaction request, geo-fence an area based on at least one of the currency exchange transaction parameters or a current location of the first user device, determine an exchange location based on the geo-fenced area and the matched physical currency transaction request and another physical currency exchange request, and provide instructions to the first user device and the second user device for an exchange based on the determined exchange location.

9 Claims, 3 Drawing Sheets

(51) Int. Cl.
  *G06Q 20/40* (2012.01)
  *G06Q 30/08* (2012.01)
  *G06Q 20/38* (2012.01)
  *G07C 9/00* (2020.01)
  *G06F 16/903* (2019.01)
  *G01C 21/00* (2006.01)
  *G06Q 30/00* (2012.01)
  *G06V 40/70* (2022.01)

(52) U.S. Cl.
  CPC ..... *G06F 16/90335* (2019.01); *G06Q 20/202* (2013.01); *G06Q 20/206* (2013.01); *G06Q 20/383* (2013.01); *G06Q 20/40145* (2013.01); *G06Q 30/0185* (2013.01); *G06Q 30/08* (2013.01); *G07C 9/00563* (2013.01); *G06V 40/70* (2022.01)

(56) References Cited

U.S. PATENT DOCUMENTS

| | | | |
|---|---|---|---|
| 8,127,983 B1 | 3/2012 | Block et al. | |
| 8,496,168 B1 | 7/2013 | Miller et al. | |
| 8,781,965 B2 | 7/2014 | Huster | |
| 8,864,022 B2 | 10/2014 | Hernandez | |
| 8,955,741 B2* | 2/2015 | Hansen | G06Q 20/00 235/379 |
| 9,412,100 B1* | 8/2016 | Shearer | G06Q 20/204 |
| 9,576,280 B2 | 2/2017 | Craig et al. | |
| 9,811,784 B2* | 11/2017 | Wan | G06Q 10/00 |
| 9,881,299 B2 | 1/2018 | Isaacson et al. | |
| 9,892,386 B2 | 2/2018 | Liberty | |
| 10,198,721 B2* | 2/2019 | DeLuca | G07F 9/001 |
| 10,217,093 B2* | 2/2019 | Trivedi | G06Q 20/3224 |
| 10,269,009 B1 | 4/2019 | Winklevoss et al. | |
| 10,380,564 B1 | 8/2019 | Wilson et al. | |
| 10,482,420 B1* | 11/2019 | Brooks | G06Q 10/0836 |
| 2001/0042024 A1* | 11/2001 | Rogers | G06Q 10/08 705/26.81 |
| 2002/0023053 A1* | 2/2002 | Szoc | G06Q 20/10 705/39 |
| 2002/0161692 A1* | 10/2002 | Loh | G06Q 40/00 705/37 |
| 2004/0143536 A1* | 7/2004 | Haberle | G06Q 40/04 705/37 |
| 2005/0171894 A1* | 8/2005 | Traynor | G06Q 20/108 705/37 |
| 2006/0095364 A1* | 5/2006 | Hamilton | G06Q 40/04 705/37 |
| 2006/0136301 A1* | 6/2006 | Grovit | G06Q 20/04 705/16 |
| 2007/0033138 A1* | 2/2007 | Obadan | G06Q 40/02 705/42 |
| 2007/0124242 A1* | 5/2007 | Reis | G06Q 20/10 705/39 |
| 2010/0017310 A1* | 1/2010 | Sadler | G06Q 30/0601 705/28 |
| 2013/0013483 A1* | 1/2013 | Dale | G06Q 40/04 705/37 |
| 2013/0024360 A1* | 1/2013 | Bailout | G06Q 40/02 705/39 |
| 2013/0054468 A1 | 2/2013 | Fuentes et al. | |
| 2013/0317961 A1* | 11/2013 | Malatesta | G06Q 40/04 705/37 |
| 2015/0026031 A1* | 1/2015 | Mullin, III | G06Q 40/04 705/37 |
| 2015/0170112 A1 | 6/2015 | Decastro | |
| 2015/0371470 A1* | 12/2015 | Brown | G07C 9/00896 340/5.61 |
| 2016/0247131 A1* | 8/2016 | Ahmed | G06Q 20/209 |
| 2017/0140367 A1 | 5/2017 | Zhou et al. | |
| 2018/0033235 A1* | 2/2018 | Dotterweich | G07F 17/12 |
| 2018/0096351 A1* | 4/2018 | Dahn | G06Q 20/386 |
| 2018/0121873 A1* | 5/2018 | Walsh | G06Q 10/0836 |
| 2018/0122007 A1* | 5/2018 | Franco | G06Q 40/04 |
| 2018/0165631 A1* | 6/2018 | Romero | G08B 13/19697 |
| 2018/0205682 A1* | 7/2018 | O'Brien, V | G06Q 10/0833 |
| 2018/0218555 A1* | 8/2018 | Nguyen | G07D 7/003 |
| 2019/0005473 A1* | 1/2019 | de Villiers | G07F 19/203 |
| 2019/0005474 A1 | 1/2019 | Cady et al. | |
| 2019/0080307 A1 | 3/2019 | Katzin et al. | |
| 2019/0108481 A1* | 4/2019 | Kashi | G06Q 10/0836 |
| 2019/0147442 A1 | 5/2019 | Cappelli et al. | |
| 2019/0197610 A1* | 6/2019 | Guare | H04L 9/3228 |
| 2019/0236878 A1* | 8/2019 | Mchale | G07C 9/00912 |
| 2019/0325383 A1* | 10/2019 | Sidhu | G06Q 10/0836 |
| 2019/0392370 A1* | 12/2019 | Kashi | G07C 9/00912 |
| 2020/0250638 A1* | 8/2020 | Johnson | G06Q 20/3678 |
| 2021/0049846 A1* | 2/2021 | Kashi | G07C 9/00912 |

* cited by examiner

REAL-TIME CURRENCY EXCHANGE SYSTEM

TECHNICAL FIELD

The described embodiments relate to communication systems. More particularly, the embodiments relate to a technical communication architecture for facilitating physical exchanges of objects.

BACKGROUND

Many businesses allow customers to pay for goods and/or services using physical currency (e.g., US dollars, Euros, etc.) as compared to digital currency provided via a mobile wallet or a card-based transaction (e.g., a credit card). When a customer uses physical currency to pay for goods and/or services and the customer does not have the currency in the exact amount that the business is charging for the goods and/or services, the customer will typically pay the business currency in an amount higher than the goods and/or services cost. In return, the business will provide the customer "change" (i.e., the difference between the amount of currency the customer paid and the cost of the goods and/or services being purchased by the customer). As a result, businesses typically need to have various denominations of currency on-site to accommodate various transactions. Further, with the increase of electronic transactions (e.g., a credit card transaction as opposed to a cash transaction) many people choose to carry little to no physical currency. While often non-problematic, many businesses still refrain from accepting non-physical currency (i.e., not accepting credit/debit/etc. payment cards). In these situations, the need for physical currency is at a premium.

SUMMARY

A first example embodiment relates to a system including a network interface circuit configured to facilitate data transmission over a network, a processing circuit including one or more processors coupled to non-transitory memory, wherein the processing circuit is configured to receive a physical currency transaction request from a first user device, the physical currency transaction request including a currency exchange transaction parameter, match the physical currency transaction request to another physical currency transaction request based at least in part on the currency exchange transaction parameter, provide the physical currency transaction request to a second user device associated with the another physical currency transaction request, geo-fence an area based on at least one of the currency exchange transaction parameters or a current location of the first user device, determine an exchange location based on the geo-fenced area and the matched physical currency transaction request and the another physical currency exchange request, and provide instructions to the first user device and the second user device for an exchange based on the determined exchange location.

Another example embodiment relates to a system including a network interface circuit configured to facilitate data transmission over a network, and a processing circuit comprising one or more processors coupled to non-transitory memory. The processing circuit is configured to receive a first physical currency transaction request from a first user device, wherein the first physical currency transaction request includes a first currency exchange transaction parameter, receive a second physical currency transaction request from a second user device, wherein the second physical currency transaction request includes a second currency exchange transaction parameter, match the first physical currency transaction request and the second physical currency transaction request based at least in part on the first currency exchange transaction parameter and the second currency exchange transaction parameter, determine an exchange location based at least in part on the first currency exchange transaction parameter and the second currency exchange transaction parameter, wherein the exchange location is a locked area or a locker, generate a credential configured to access the exchange location, and provide a currency exchange instruction including the credential to the first user device and the second user device to facilitate an exchange of a first amount of physical currency.

Another example embodiment relates to a computing device including a network interface circuit configured to facilitate data transmission over a network, and a processing circuit comprising one or more processors coupled to non-transitory memory, wherein the processing circuit is configured to send search criteria parameters including a time for an exchange, a location for the exchange, and an amount of physical currency for the exchange, receive a plurality of physical currency exchange requests including currency exchange transaction parameters based on matching the currency exchange transaction parameters to the search criteria parameter, receive a user indication from a first user of an acceptance of one of the plurality of physical currency exchange requests, prompt the first user for at least one of a biometric scan or a passcode based on the acceptance of one of the plurality of physical currency exchange requests, receive the biometric scan or the passcode in response to the prompt, authenticate the received biometric scan or the passcode, and based on the authentication, receive currency exchange instructions including a secure exchange location for the exchange.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
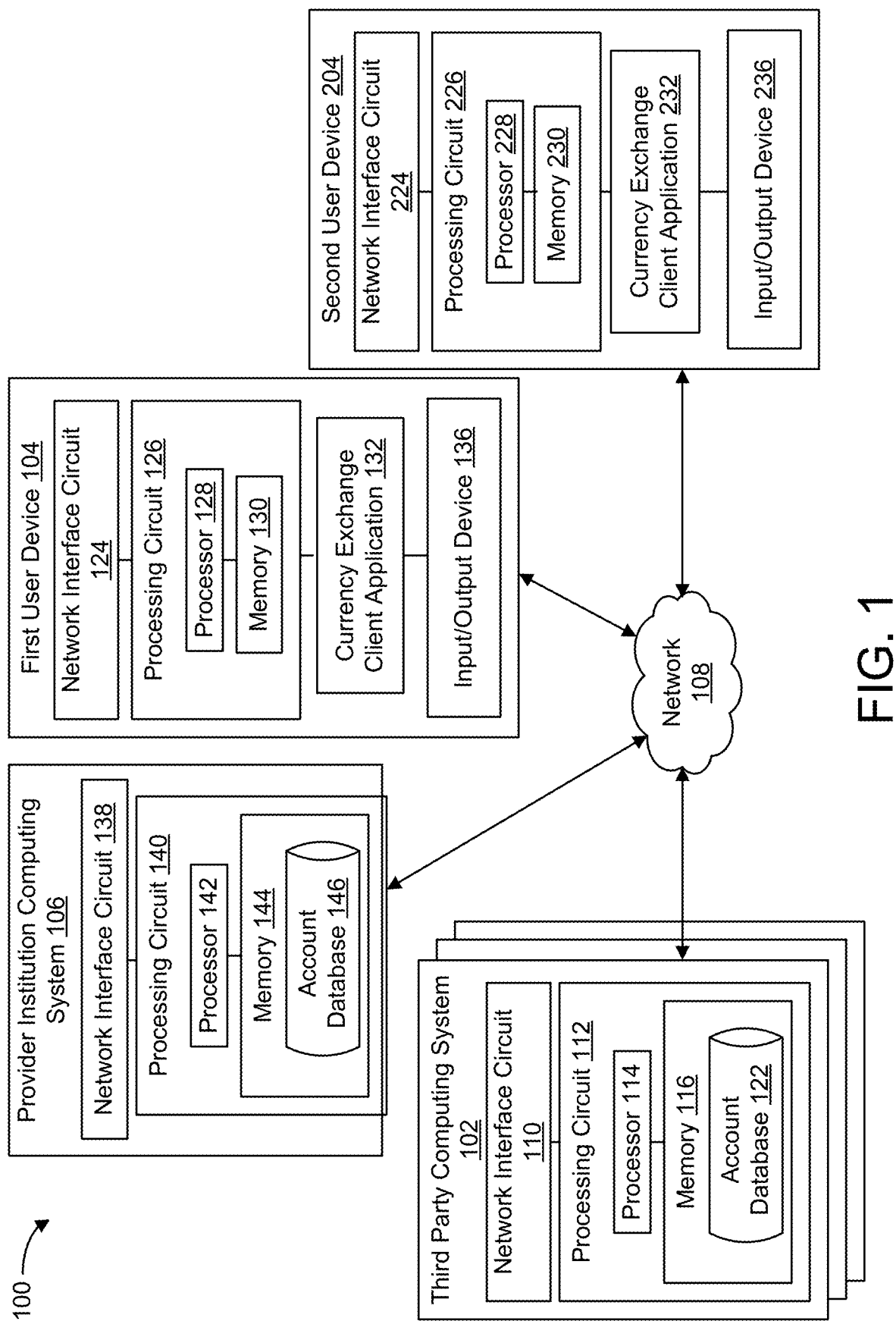
FIG. 1 is a block diagram of a real-time currency exchange system according to an example embodiment.

Referring generally to the Figures, systems and methods for a real-time currency exchange platform are disclosed. According to various example embodiments, a real-time currency exchange platform allows users to purchase and sell physical currency in real time. In some embodiments, a real-time currency exchange system may connect various users to enable an exchange of physical currency. In other embodiments, a real-time currency exchange system may allow users to purchase and sell physical currency through a provider institution (e.g., a bank) or other third party.

Having sufficient amounts and denominations of physical currency on-site is important for any business that accepts physical currency from customers. Without proper amounts and denominations of physical currency on site, a business may not be able to provide a customer with the proper amount of change (i.e., the difference between the cost of the goods and/or services provided by the business and the amount of physical currency given to the business by the customer), and therefore, the business may lose customers and/or sales opportunities. Currently, businesses may utilize services offered by various provider institutions (e.g., a bank) to maintain ample physical currency on-site at the business. For example, a provider institution may send a vehicle to a business to deliver physical currency in desired denominations to the business to keep on-site. Additionally, the vehicle sent by the provider institution may accept a surplus of physical currency from the business, which may then be deposited into the businesses financial account (e.g., savings account, checking account, etc.) with the provider institution. Physical currency delivery and transportation may be an expensive service for a business. Some businesses require several physical currency deliveries daily. It may also be difficult to predict the amount of physical currency a business will need to keep on-site on any given day. Therefore, there is a need for a real-time currency exchange system that enables nearby users (e.g., businesses, individuals, organizations, etc.) to purchase or otherwise acquire physical currency from other users, and/or sell physical currency to other users.

According to the described aspects and embodiments of the innovation, the real-time currency exchange system allows a first user of the system to exchange physical currency with a second user of the system. Technically, the present system leverages location-based services along with secure matching processes to connect entities for secure physical currency exchanges. Real-time location data in combination with an identification of secure exchange sites serves to improve upon existing physical currency exchange systems. Entities are verified, exchange sites are confirmed and verified in real or near real time, and a communication is provided via a secure platform to improve communication and data exchange platforms. Thus, the various aspects and embodiments described herein provide a technical improvement in present currency exchange communication systems where additional security may be required. In this regard, the described aspects and embodiments of the innovation identify a secure exchange site for the parties in real or near real-time to permit a currency exchange securely and quickly. Accordingly, technical fields may include multi-path communications, and the described aspects and embodiments of the systems and methods improve upon existing multi-path communications by at least providing a real-time currency exchange system configured to filter multiple currency exchange requests, match requests based on transaction parameters, and isolate communications between matched devices to decrease bandwidth constraints and optimize communications.

Referring now to FIG. 1, a block diagram of a real-time currency exchange system 100 is shown according to some embodiments. As will be described in further detail below, real-time currency exchange system 100 can provide users (e.g., customers, clients, account holders, etc.) with the ability to sell, bid on, purchase, and/or otherwise exchange physical currency with other users. As shown, the real-time currency exchange system 100 includes a third party computing system 102, a first user device 104, a second user device 204, and a provider institution computing system 106. Third party computing system 102 is shown to be communicatively and operatively coupled to the first user device 104, the second user device 204, and the provider institution computing system 106 via a network 108. It should be appreciated that there may be multiple third part computing systems 102. Network 108 provides communicable coupling between third party computing system 102, first user device 104, second user device 204, provider institution computing system 106, and/or other components disclosed and described herein to provide and facilitate the exchange of communications (e.g., data, instructions, messages, values, commands, etc.). The network 108 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 108 includes a proprietary banking network to provide secure or substantially secure communications.

The first user device 104 and the second user device 204 can be any type of computing device associated with a first user and a second user, respectively. The first user associated with the first user device 104 may be an account holder of at least one financial account managed by the provider institution (associated with the provider institution computing system 106) and/or a third party account provider (associated with third party computing system 102). The second user associated with the second user device 204 may be an account holder of at least one financial account managed by the provider institution (associated with the provider institution computing system 106) and/or a third party account provider (associated with third party computing system 102). In other embodiments, the first user and/or second user may be non-customers of the provider institution associated with the provider institution computing system 106 (or third-party).

The first user device 104 and second user device 204 can be any type of computing device that may be used to access and/or modify account information of accounts relating to the user. In this regard, the first user device 104 and the second user device 204 may include any wearable or non-wearable computing device. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc. The first user device 104 and the second user device 204 may also include any type of computing device including, but not limited to, a phone (e.g., smart phone), a tablet, a laptop, a desktop computer, a personal digital assistant, etc. The first user device 104 and the second user device 204 may be the same computing devices (e.g., the first user device 104 is a tablet and the second user device 204 is a tablet). Alternatively, the first user device 104 and the second user device 204 may be different computing devices (e.g., the first user device 104 is a phone and the second user device 204 is a laptop). In some embodiments, the first user utilizes the first user device 104 to access account information that is stored and/or otherwise managed by the third party computing system 102. In some embodiments, the second user utilizes the second user device 204 to access account information that is stored and/or otherwise managed by the third party computing system 102.

As shown in FIG. 1, the first user device 104 includes a network interface circuit 124 configured to enable the first user device 104 to exchange information over the network 108, a processing circuit 126, and an input/output (I/O)

device 136. The network interface circuit 124 can include program logic that facilitates connection of the first user device 104 to the network 108. The network interface circuit 124 can support communications between the first user device 104 and other systems, such as the third party computing system 102. For example, the network interface circuit 124 can include a cellular modem, a Bluetooth transceiver, a radio-frequency identification (RFID) transceiver, and a near-field communication (NFC) transmitter. In some embodiments, the network interface circuit 124 includes the hardware and machine-readable media sufficient to support communication over multiple channels of data communication. Further, in some embodiments, the network interface circuit 124 includes cryptography capabilities to establish a secure or relatively secure communication session between the first user device 104 and the third party computing system 102 and/or the provider institution computing system 106. In this regard, information (e.g., account information, login information, financial data, and/or other types of data) may be encrypted and transmitted to prevent or substantially prevent a threat of hacking.

The processing circuit 126 is shown to include a processor 128 and a memory 130. The processor 128 may be implemented as one or more application specific integrated circuits (ASICs), field programmable gate arrays (FPGAs), a group of processing components, or other suitable electronic processing components. The memory 130 may be one or more devices (e.g., RAM, ROM, Flash memory, hard disk storage) for storing data and/or computer code for completing and/or facilitating the various processes described herein. The memory 130 may be or include non-transient volatile memory, non-volatile memory, and non-transitory computer storage media. The memory 130 may include database components, object code components, script components, or any other type of information structure for supporting the various activities and information structures described herein. The memory 130 may be communicably coupled to the processor 128 and include computer code or instructions for executing one or more processes described herein.

In certain embodiments, the processing circuit 126 may include multiple processors 128. For example, the processing circuit 126 of the user device may include a secure enclave processor 128 that is hardware-level isolated from the primary processor 128. The secure enclave processor 128 enables encryption and storage of secure information. For example, secure information may be encrypted by the secure enclave processor 128 and the secure information may then be accessed by the primary processor 128 using private keys that are unique to the user device 104. In certain embodiments, the secure information stored in the secure enclave processor 128 may be accessed in response to authenticating a biometric scan taken by the user device 104.

The user device 104 is shown to include a currency exchange client application 132, also referred to as a real-time currency exchange (RTCE) application. In the example shown, the currency exchange client application 132 may be provided and supported by the provider institution. The currency exchange client application 132 is configured to allow the first customer to interact with the customer's accounts. In some embodiments, the currency exchange client application 132 is configured to generate and provide displays for presentation/display by the user device 104 (e.g., to the I/O device 136 described below) that enable the customer to view and/or manage customer accounts and, in particular, utilize the real-time currency exchange system 100. Accordingly, the currency exchange client application 132 is configured to send information to, and receive information from, the provider institution computing system 106. In some embodiments, the currency exchange client application 132 may be included with another application of the provider institution (e.g., a mobile banking application, a mobile wallet application, etc.). In other embodiments, the currency exchange client application 132 is a separate currency exchange client application relative to other provider institution applications. However, the currency exchange client application 132 may be coupled to these application(s) such that information is readily exchanged between the applications via one or more APIs (e.g., account balance information, etc.). The currency exchange client application 132 may couple to a website via the network.

As alluded to above, in some embodiments, the currency exchange client application 132 may be incorporated with an existing application in use by the provider institution computing system 106 (e.g., a mobile banking application, a service provider application, etc.). In other embodiments, the currency exchange client application 132 is a separate software application implemented on the user device 104. The currency exchange client application 132 may be downloaded by the user device 104 prior to its usage, hard coded into the memory 130 of the user device 104, or be a network-based or web-based interface application such that the user device 104 may provide a web browser to access the application, which may be executed remotely from the user device 104. Accordingly, the user device 104 may include software and/or hardware capable of implementing a network-based or web-based application. For example, in some instances, the currency exchange client application 132 includes software such as HTML, XML, WML, SGML, PHP (Hypertext Preprocessor), CGI, and like languages.

In certain embodiments, the currency exchange client application 132 includes an application programming interface (API) and/or a software development kit (SDK) that facilitate the integration of other applications with the currency exchange client application 132. For example, in some embodiments, the currency exchange client application 132 is configured to utilize the functionality of the provider institution computing system 106 through an API.

In some embodiments, the customer interacts with the currency exchange client application 132 via an I/O device 136. The I/O device 136 can include hardware and associated logics that enable the customer to exchange information with the user device 104. An input component of the I/O device 136 can allow the customer to provide information to the user device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow the user device 104 to provide information to the customer. For example, the output component may include a digital or touchscreen display, a speaker, illuminating icons, LEDs, etc. In this way, the customer can interact with the currency exchange client application 132. For example, the customer may provide login information (e.g., customer name, password, etc.) by typing on a mechanical keyboard or touchscreen keyboard included in the I/O device 136 and be provided account information on a digital display component of the I/O device 136.

As shown in FIG. 1, the second user device 204 includes a network interface circuit 224 configured to enable the second user device 204 to exchange information over the network 108, a processing circuit 226, and an input/output (I/O) device 236. The second user device 204 may be similar to the first user device 104. For example, the second user device 204 includes a network interface circuit 224 that is similar to the network interface circuit 124. The second user device 204 is shown to include a processing circuit 226 that includes a processor 228 and a memory 230. The processing circuit 226 may be the same or similar to the processing circuit 126. Further, the processor 228 and the memory 130 may be similar to the processor 128 and the memory 130, respectively. The second user device 204 may include a currency exchange client application 232, also referred to as a real-time currency exchange (RTCE) application that may be similar to the currency exchange client application 132. The second user device 204 may include an I/O device 236 that is similar to the I/O device 136. Thus, different reference numbers are used with the second user device 204 for clarity, but it should be appreciated that the second user device 204 may have the same or similar structure as the first user device. In other embodiments, the structure of the user devices may differ.

As shown in FIG. 1, the real-time currency exchange system 100 includes a provider institution computing system 106. The provider institution computing system 106 is associated with a provider institution. The provider institution may be a financial institution such as a bank, credit union, credit card company, and so on. The provider institution computing system 106 includes a network interface circuit 138 and a processing circuit 140. The network interface circuit 138 includes program logic that facilitates connection of the provider institution computing system 106 to other components of the real-time currency exchange system 100 over the network 108.

The processing circuit 140 includes a processor 142 and a memory 144. As shown in FIG. 1, the memory 144 includes an account database 146. In other embodiments, the account database 146 may be separate from the memory. The account database 146 is configured to retrievably store account information generated and provisioned by the provider institution computing system 106, as described herein. In this regard, the account database 146 is configured to store data associated with customers. The account information stored therein may be generated internally (e.g., at the provider institution computing system 106) or by other entities (e.g., at the first user device 104). Alternatively, or additionally, the processing circuit 140 may provide the account information to a user device (e.g., the first user device 104 and/or the second user device 204), such that the user device may store the account information in a currency exchange client application (e.g., the currency exchange client application 132 and/or the currency exchange client application 232) maintained internally within the user device.

The network interface circuit 138 includes program logic that facilitates connection of the provider institution computing system 106 to the network 108. The network interface circuit 138 can support communication between the other provider institution computing systems 106 and other systems, such as the first user device 104, the second user device, the third party computing system 102, and/or any third-party computing systems. For example, the network interface circuit 138 can include a cellular modem, a Bluetooth transceiver, a radio-frequency identification (RFID) transceiver, and a near-field communication (NFC) transmitter. In some embodiments, the network interface circuit 138 includes the hardware and machine-readable media sufficient to support communication over multiple channels of data communication. Further, in some embodiments, the network interface circuit 138 includes cryptography capabilities to establish a secure or relatively secure communication session between other systems such as the first user device 104, the second user device 204, the third party computing system 102, and/or any third-party computing system. In this regard, information (e.g., account information, login information, financial data, and/or other types of data) may be encrypted and transmitted to prevent or substantially prevent a threat of hacking.

The processor 142 may be implemented as one or more application-specific integrated circuits (ASICs), field-programmable gate arrays (FPGAs), a group of processing components, or other suitable electronic processing components. The memory 144 may be one or more devices (e.g., RAM, ROM, Flash memory, hard disk storage) for storing data and/or computer code for completing and/or facilitating the various processes described herein. The memory 144 may be or include non-transient volatile memory, non-volatile memory, and non-transitory computer storage media. The memory 144 may include database components, object code components, script components, or any other type of information structure for supporting the various activities and information structures described herein. The memory 144 may be communicably coupled to the processor 142 and include computer code or instructions for executing one or more processes described herein. In some embodiments, the provider institution computing system 106 is a distributed computing system and includes one or more servers. In this case, provider institution computing system 106 may include multiple network interface circuits 138 and/or multiple processing circuits 140.

As shown in FIG. 1, the real-time currency exchange system 100 includes a third party computing system 102 operated by a third party. The third party may own, be associated with, or otherwise manage a site for the physical currency exchange described herein. Accordingly, the third party may be a merchant, a financial institution, etc. In some alternate embodiments, the third party may transport physical currency for the physical currency exchange (e.g., a courier). In one embodiment, the third party may maintain secure lockers, secure containers, and/or secure rooms/buildings for the physical currency exchange described herein.

The third party computing system 102 may be the same or similar to the provider institution computing system 106. The third party computing system 102 is shown to include a network interface circuit 110 that may be similar to the network interface circuit 138. The third party computing system is shown to include a processing circuit 112 that may be similar to the processing circuit 140. For example, the processing circuit 112 may include a processor 114, a memory 116, and an account database 122 that are similar to the processor 142, the memory 144, and the account database 146, respectively. The third party computing system 102 may communicate with the provider institution computing system 106.

Figure 2:
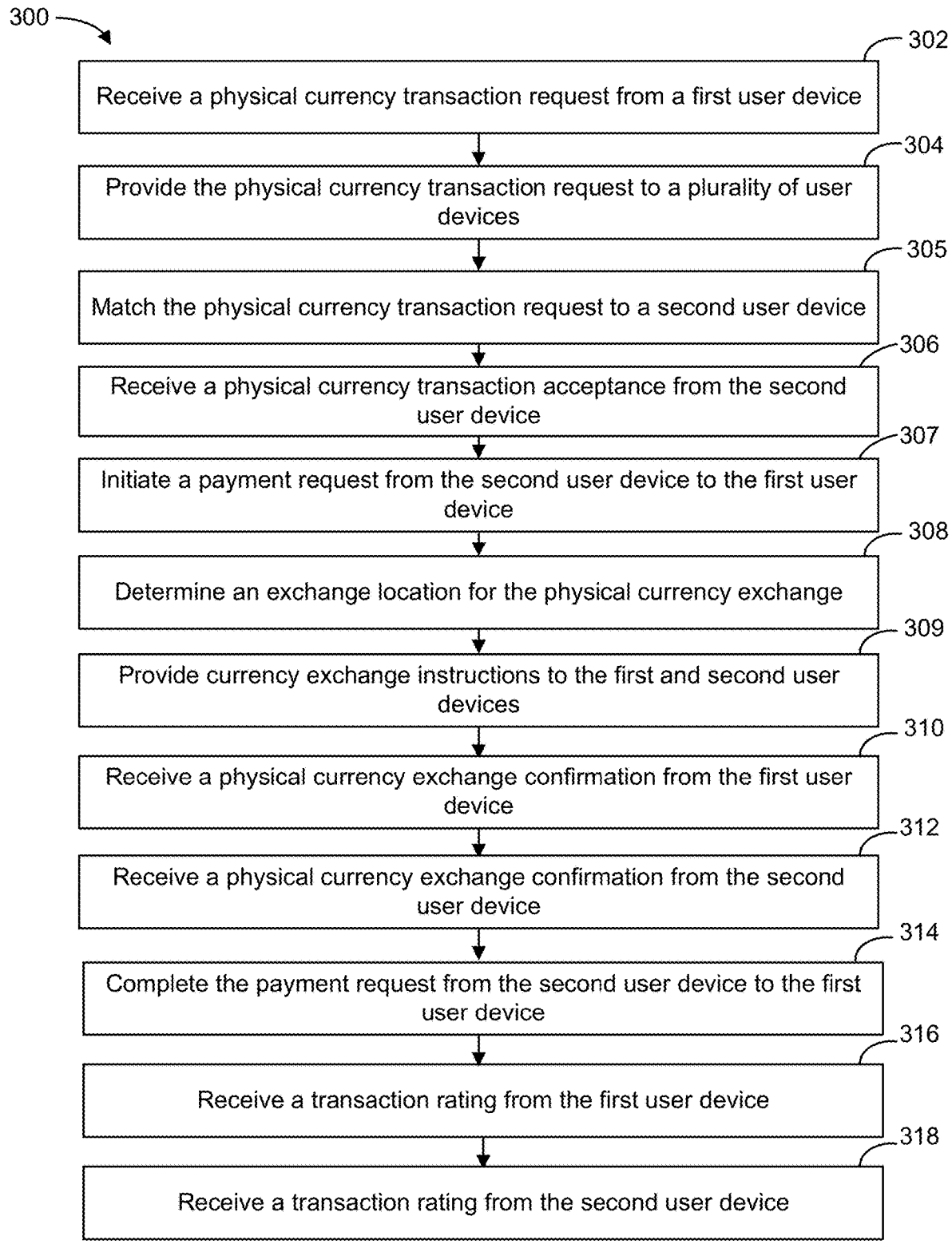
FIG. 2 is a flow diagram of a currency exchange process using, at least in part, the system of FIG. 1, according to an example embodiment.

Referring now to FIG. 2, a flow diagram of a real-time currency exchange process 300 is shown according to an example embodiment. It should be appreciated that the processes need not be performed in the order displayed in FIG. 2. Further, certain processes may be omitted and additional processes may be performed in addition to the processes shown in FIG. 2. The real-time currency exchange process 300 may be implemented using, for example, the real-time currency exchange system 100. Accordingly, reference is made to the system 100 to aid explanation of the process 300.

At process 302, a physical currency transaction request from a first user is received from the currency exchange client application 132 of the first user device 104. For example, the physical currency transaction request may be received by the provider institution computing system 106. The physical currency transaction request may be input by the first user on the currency exchange client application 132 of the first user device 104. The first user device 104 may then send, or otherwise make available, the physical currency transaction request to the provider institution computing system 106 or the second user device 204 via the network 108.

The physical currency transaction request may be a request for physical currency or a request to provide physical currency. For example, the first user may be a currency provider (i.e., offering to sell physical currency) and the second user may be a currency requestor (i.e., offering to purchase physical currency). The physical currency transaction request may include one or more currency exchange transaction parameters. Each currency exchange transaction parameter defines a desired exchange transaction characteristic.

The currency exchange transaction parameters may define an amount of physical currency requested or to be sold/bid on. Further, the currency exchange parameters may define the type of currency requested or to be sold/bid on. For example, the currency exchange transaction parameters may define the type of physical currency (e.g., US dollars, euros, etc.), and the denominations of physical currency (e.g., $5 bills, $20 bills, $100 bills).

The currency exchange transaction parameters may define a method of transportation for the physical currency. For example, the currency exchange transaction parameters may specify that the buyer, also referred to as a currency requestor (e.g., second user), must pick up the physical currency from the location of the seller, that the seller must deliver the physical currency to the location of the buyer, or that the seller must deliver the physical currency to a specified secured locker. The currency exchange transaction parameters may also specify that the provider is able to deliver a first amount of physical currency to the currency requestor (e.g., second user), and that a third user (e.g., second provider) can provide a second amount to the currency requestor (e.g., second user).

The currency exchange transaction parameters may also define a time that the currency exchange transaction must take place (e.g., the exchange must be completed by a certain time, etc.). The currency exchange transaction parameters may define a location for the physical currency exchange (e.g., a request that the physical currency be exchanged at a particular location (e.g., at a bank, a police station, a secured locker, etc.)). The currency exchange transaction parameters may define a distance that the second user must be within (e.g., the first user is willing to deliver the first amount of physical currency within a 5 mile range). In a situation in which the currency provider (e.g., first user) is a corporate user with a brick and mortar storefront, the currency exchange transaction parameters may define the location of the storefront as the transaction location. In such an example, to increase transparency and security, the exchange transaction may take place at a register (e.g., cash register) of the currency provider's (e.g., first user's) storefront.

The currency exchange transaction parameters may further define a desired physical currency amount (or amount that is being sold), a denomination breakdown of the desired physical currency amount, whether the physical currency is being sold or allowed to be bid on, and/or other parameters that define the characteristics of the physical currency exchange transaction. Further, while the physical currency transaction request is configured to enable a physical currency requestor (e.g., second user) to obtain physical currency, the requestor may also be required to pay for that physical currency. The currency exchange transaction parameters may define an accepted method of payment for the physical currency exchange transaction. For instance, the currency exchange transaction parameters may specify an amount and a method of payment, such as a digital currency transaction such as P2P, wire transfer to an account maintained by the provider institution, PayPal, or Venmo.

In operation and for convenience, the currency provider (e.g., first user) may receive more value in return than what the currency provider (e.g., first user) gives in physical currency. This additional amount is intended to compensate the currency provider (e.g., first user) for their time and the physical currency. The additional amount may be defined in a currency exchange transaction parameters by the currency provider (e.g., first user) via the currency exchange client application 132 such that it is dynamic in nature. In certain other examples, the provider institution computing system may have a set amount for the exchanged physical currency amount. For example, the provider institution computing system may implement a ladder payment: more payment is required for an increasing amount of physical currency (e.g., a first amount above the currency amount for a currency amount of X, a second amount above the currency amount for a currency amount of X+Y where the second amount is more than the first amount, and so on). As another example, if the currency provider (e.g., first user) is offering to provide the physical currency to the currency requestor (e.g., second user) directly, the currency provider (e.g., first user) may require a delivery fee.

Additionally, the currency exchange transaction parameters may define adjusted pricing (e.g., a discount or preferential pricing) for the currency exchange transaction. For example, if a currency provider (e.g., first user) is using the currency exchange client application 132 to exchange physical currency, the provider may launch the currency exchange client application 132 and submit a physical currency transaction request that includes a currency exchange transaction parameters that defines a discount if a purchaser is paying for the physical currency using cryptocurrency. The currency exchange transaction parameters may also define an additional fee if the purchaser is using tangible assets to purchase the physical currency.

The physical currency transaction request may be sent to the provider institution computing system 106 via the network 108. In some embodiments, the physical currency transaction request may additionally or alternatively be sent to the third party computing system 102.

At process 304, the physical currency transaction request is provided to a plurality of user devices, including the second user device 204. For example the provider institution computing system 106 and/or the first user device 104 may provide the physical currency transaction request to a plurality of user devices, including the second user device 204. For example, the physical currency transaction request may be received and displayed within the currency exchange client application 232 of the second user device 204. Alternatively, or in addition to, the second user device 204 may be used to access the currency exchange client application 232 such that the second user may search (e.g., scroll on the I/O device 236) through a database of physical currency transaction requests, including various physical currency transaction requests that have been received from multiple users. For example, the currency exchange client application 232 may generate and provide a graphical user interface (GUI) that enables the second user to filter the list of physical currency transaction requests depending on whether they were made by currency providers or currency requestors. These results may further be sorted and filtered based on one or more currency exchange transaction parameters included in each physical currency transaction request. The database of physical currency transaction requests may be stored on the account database 146 of the provider institution computing system 106 and periodically transmitted to the user device and, particularly, client applications (e.g., via preset or manual refreshes).

The physical currency transaction request may be transmitted to specific user devices (e.g., the second user device 204) based on the currency exchange transaction parameters. For example, the physical currency transaction request may be transmitted based on the type of currency transaction requested and/or the location requested. For example, those seeking to sell physical currency may be matched or paired with those looking to purchase or bid on physical currency. As another example, the request may be based on location such that only users within a preset or predefined area (i.e., a geo-fenced areas) of the first user, or a specified exchange location defined by the currency exchange transaction parameters, are pinged or otherwise notified.

In an example embodiment, the first user is a currency provider and the second user is a currency requestor. In this embodiment, the first user may use the currency exchange client application 132 to send a physical currency transaction request (e.g., offering to sell and deliver $5,000 in physical currency to anyone within a 3 mile range of the first user) to the provider institution computing system 106. The provider institution computing system 106 may then provide (e.g., distribute) the physical currency transaction request to any or all user devices within the system via the client application (e.g., the currency exchange client application 232). If the first user is offering to sell and deliver $5,000 in physical currency to anyone within a 3 mile range of the first user, the physical currency transaction request may only be sent to users within a 3 mile radius. For example, using the location-based information from the client application on the other user devices, the provider institution computing system 106 may identify in real or near real-time the other user devices that are presently within the preset distance (3 miles in this example) to the first user. Accordingly, the physical currency transaction request may be provided to those identified users (e.g., via the client applications on their devices, as a push notification, as a text message, as an email, causing a phone call to their device, etc.). For example, if the second user device 204 is a mobile phone or tablet, providing the physical currency transaction request to the currency exchange client application 232 may include providing a notification that is displayed within the currency exchange client application 232, the message indicating the contents of the physical currency transaction request (including the currency exchange transaction parameters) sent by the first user (e.g., offering to sell and deliver $5,000 in physical currency to anyone within a 3 mile range of the first user).

In various examples, the currency exchange client application 232 may be able to display multiple currency requests from multiple users. For example, the currency exchange client application 232 may launch a map that shows physical currency transaction requests from all the users within a specified distance (e.g., all users willing to sell physical currency within a 3 mile radius of the second user). In at least this example, one or more indicia may appear on the map that indicate the corresponding location of the currency providers, or a delivery location specified by the corresponding currency providers. Such a map may be launched and displayed at the request of a currency requestor (e.g., second user). In another example, the currency exchange client application 232 may display a list of all currency providers that are offering to sell physical currency. The currency requestor (e.g., second user) may scroll through the list and select a desirable currency provider.

In yet another example, the currency exchange client application 232 may display a list of all currency requestors (i.e., purchasers) that are offering to buy physical currency. Similar to the example described above, the currency exchange client application 22 may launch a map that shows one or more indicia that correspond to the location of the currency requestors, or a delivery location specified by the corresponding currency requestors. Such a map may be launched and displayed at the request of a currency provider (e.g., first user).

In another example embodiment, the currency requestor (e.g., second user) may enter search criteria parameters. The currency requestor (e.g., second user) may enter search criteria parameters based on desired characteristics of the currency exchange (e.g., the physical currency must be delivered, the seller must be willing to sell at least a minimum amount of physical currency, the seller must be willing to sell at least a minimum amount of a certain denomination of physical currency, a desired payment method for the physical currency such as a wire transfer, etc.). A search criteria parameter refers to a condition that may be selected or provided by a user to sort and filter physical currency transaction requests that are made by other users. For example, a user may enter a search criteria parameter into the currency exchange client application 132 to browse available physical currency transaction requests. The search criteria parameters may then be compared to currency exchange transaction parameters included in currency exchange transaction requests made by other currency providers. The currency exchange transaction requests that include the desired characteristics, as defined by the search criteria parameters, are then matched to the currency requestor (e.g., second user) such that the currency requestor may browse all of the matching currency exchange transaction requests. In this example embodiment, rather than submitting a physical currency transaction request, the currency provider enters search criteria parameters and browses physical currency transaction requests that match the search criteria parameters. The currency exchange client application 232 may display all or nearly all possible physical currency transaction requests that match the currency requestor's (e.g., second user's) search criteria parameters. For example, a cash requestor may enter a search criteria parameter that defines a minimum amount of physical currency that is being offered for sale. The currency exchange client application 132 may then display physical currency transaction requests that are offering for sale an amount of physical currency that is greater than or equal to the minimum amount of physical currency defined by the search criteria parameter.

In certain embodiments, certain currency exchange transaction parameters of the physical currency transaction request made by the first user device 104 are concealed from other users. For example, the exact amount of currency being offered for sale by the first user, as defined by the currency exchange transaction parameter, may be concealed from the other users that the physical currency transaction request is provided to. Additionally, the location of the first user device 104, and the desired exchange location as defined by the currency exchange transaction parameters, may be concealed. Instead a general vicinity of the first user's location, or the desired exchange location, may be provided to the other users. In certain examples, certain aspects of the currency exchange transaction parameters may be censored, obscured, or otherwise concealed until a transaction request has been accepted. Such parameters may be censored, obscured, or otherwise concealed within a GUI presented by the currency exchange client application, and only upon acceptance and confirmation are all of the aspects of the currency exchange transaction parameters revealed.

For instance, in one example, if the first user wishes to exchange physical currency at a secured locker or another location, the exact location of the requested place of exchange may be concealed from the other users that the physical currency transaction request is provided to. Thus, browsers of currency transaction providers and requestors may simply see currency requestors or providers in San Francisco (or some other generalized area) and not the particular exact geographic locations of the specific currency providers or requestors within San Francisco. The foregoing examples enhance the security of the described system 100 by only revealing the information necessary to initiate an exchange.

In some embodiments, the physical currency transaction request submitted by the first user device 104 on the currency exchange client application 132 may include an invitation to place bids on a first amount of physical currency to procure that physical currency. For example, the first user may offer $5,000 of physical currency for sale on the currency exchange client application 132, and may indicate that the first user device 104 is accepting bids on the offer for a certain period of time. In some embodiments, once the period of time expires, a physical currency transaction acceptance (as will be discussed further herein) may be sent from the highest bidder in response to the physical currency transaction request. The first user may also use the currency exchange client application 132 to further define a minimum acceptable bid. A "bid" refers to an offer that is made by a cash requestor to purchase physical currency at a certain price from a currency provider that is offering the physical currency for sale. For example, the bid may define the maximum amount a purchaser is willing to pay for custody and delivery of the physical currency. In some examples, the bid includes a transaction fee and/or a delivery fee.

In certain embodiments, the currency exchange client applications 132, 232 may include a graphical user interface (GUI) so that users may engage in bidding. In the GUI, a plurality of physical currency transaction requests may be sorted and filtered based on the currency exchange transaction parameters included in the physical currency transaction requests. For example, the GUI may enable the user to set an upper and lower threshold indicating the maximum and minimum amount of physical currency to be exchanged, a set price for the physical currency, and a current price of an ongoing bid for a particular amount of physical currency.

In certain examples, a GUI may enable the user to select each individual physical currency transaction request for more details on the physical currency transaction request. Further, the GUI may include a map that displays the plurality of physical currency transaction requests. The map may further show some of the currency exchange transaction parameters. For example, each physical currency transaction request may include currency exchange transaction parameters that define a geo-fenced area of potential exchange locations. In some embodiments, the map may include all of the geo-fenced areas that correspond with each physical currency transaction request. It should be appreciated that the GUI may allow the user to filter and sort the plurality of physical currency transaction requests based on any of the currency exchange transaction parameters.

At process 305, the physical currency transaction request is matched with one or more other devices (e.g., second user device 204). For example, the physical currency transaction request may be matched to the second user device 204 by the provider institution computing system 106. In certain embodiments, process 305 includes matching currency requestors to currency providers (or vice versa) based on the currency exchange transaction parameters (e.g., the amount of physical currency to be exchanged, the accepted methods of payment for the physical currency, etc.). For example, the first user may submit a first physical currency transaction request having first currency exchange transaction parameter on the currency exchange client application 132, and the second user may submit a second physical currency transaction request having second currency exchange transaction parameters on the currency exchange client application 232. That is, in certain specific examples, a physical currency transaction request for a currency sale may be matched with another currency transaction request for a currency purchase. The provider institution computing system 106 may then match the first physical currency transaction request to the second physical currency transaction request based on the first and second currency exchange transaction parameters. That is, the provider institution computing system 106 may match the two requests based on the two requests sharing the same (or some of the same) currency exchange transaction parameters. Generally, this match will at least include a match between the amount of physical currency requested and the amount of physical currency provided. In certain embodiments, a minimum number of currency exchange transaction parameters from each physical currency transaction request must be matched. Further, some currency exchange transaction parameters may be prioritized over others. For example, a match between the amount of physical currency requested and the amount of physical currency provided may be prioritized over a match between preferred exchange times. Thus, when matching physical currency transaction requests, certain currency exchange transaction parameters may trump others. The user may use the currency exchange client application 132 to define which currency exchange transaction parameters are to be prioritized over others.

Alternatively, the physical currency transaction request may be matched to the second user device 204 by the provider institution computing system 106 based on a match between search criteria parameters and the currency exchange transaction parameters. In such an example, the second user may search for a physical currency transaction request on the currency exchange client application 232 using search criteria parameters. The provider institution computing system 106 may then match the first physical currency transaction request to the second user device based on a match the first currency exchange transaction parameter and the search criteria parameters.

In various embodiments, matching may be done based on the current location of the first user device 104 and/or the second user device 204. For example, a geo-fenced area may be determined by the provider institution computing system 106 based on the location of the first user device 104, which may be altered or modified by a currency exchange transaction parameter. Alternatively, the geo-fenced area may be determined by the provider institution computing system 106 based on the currency exchange transaction parameter, without considering the current location of the first user device 104. Therefore, the geo-fenced area may be determined by the provider institution computing system 106 based on at least one of the currency exchange transaction parameters or a current location of the first user device. For example, a default region (e.g., one mile) may be provided for matching currency requestors/providers, but the user, via the client application 132, may alter this radius to increase or decrease the area of the default region. Either way, the currency exchange transaction parameters may be used to define a desired radius or area that the user is willing to travel to provide/receive physical currency. The physical currency transaction request may then be matched to all, or nearly all, the other user device(s) within that geo-fenced area, such that one of the other user devices (e.g., the second user device 204) may accept the physical currency transaction request. In some embodiments, the matching may include identifying an exchange location. As previously discussed herein, the exchange location refers to the area where the physical currency is provided and retrieved.

In certain embodiments, matching may be done by the provider institution computing system 106 based on timing requirements (e.g., timing requirements defined in the currency exchange transaction parameters). For example, if the first user device 104 and the second user device 204 submit physical currency exchange requests, the first user device 104 and the second user device 204 may be matched based on the time requirements defined by the currency exchange transactions parameters. In some embodiments, a notification may be sent to the first user device 104 and the second user device 204 on the currency exchange client applications 132, 232 giving both parties the option to accept a physical currency exchange request within a pre-determined amount of time. If both parties use the currency exchange client application 132, 232 to accept the physical currency exchange request within the pre-determined amount of time, then the first user device 104 and the second user device 204 may be matched. In certain embodiments, the pre-determined amount of time may be defined by the currency exchange transaction parameters.

In some embodiments, the physical currency transaction request may be matched by the provider institution computing system to a second user device 204 in real-time in response to a second user selecting the physical currency transaction request on the second user device. For example, the first user may use the first user device 104 to make a physical currency transaction request to sell physical currency on the currency exchange client application. The second user may browse available physical currency transaction requests on the second user device 204, and select the physical currency transaction request. The provider institution computing system 106 may then match the physical currency transaction request to the second user device 204.

In certain embodiments, multiple physical currency transaction requests may be received by the provider institution computing system 106 from multiple user devices (e.g., the first user device 104 and the second user device 204). The provider institution computing system 106 may then match users offering to buy physical currency with users offering to sell physical currency. For example, a first user may submit a physical currency transaction request to sell $5,000 of physical currency, and a second user may submit a physical currency transaction request to buy $5,000 of physical currency. In some example embodiments, the provider institution computing system 106 may then automatically match the first user and the second user, and proceed to send the first user and second user currency exchange instructions, as will be discussed further below. In this example embodiment, a physical currency transaction request made by a user may not be provided to all other users. The provider institution computing system 106 may limit, and selectively provide determined matches to users, such as via the currency exchange client application or another means (e.g., via email). Once a match has been ascertained, the user, via the client application 132, can accept or deny the determined matches. Beneficially, this matching process alleviates the user's need to manually search and identify potential matches.

Process 306 includes receiving a physical currency transaction acceptance from a second user device 204. For example, responsive to a match between two physical currency transaction requests, or a match based on search criteria, or a selection of a physical currency transaction request by the second user, an acceptance to complete the exchange transaction may be communicated by the second user device 204. For example, the physical currency transaction acceptance may be received by the currency exchange client application 132 on the first user device 104 and/or received by the provider institution computing system 106. For example, the second user may use the currency exchange client application 232 of the second user device 204 to send the physical currency transaction acceptance to the provider institution computing system 106 via the network 108.

In an example embodiment, the physical currency transaction acceptance from the second user may be sent in response to the physical currency transaction request sent by the first user at process 302, and may include a partial or complete acceptance of the physical currency transaction request made by the first user. For example, if the physical currency transaction request sent by the first user at process 302 included an offer to sell and deliver $5,000 of physical currency, the second user may opt to purchase $3,000 of physical currency from the first user, to be delivered by the first user. In some embodiments, the first user may have the ability to reject any partial and/or complete acceptances of physical currency transaction requests.

In some embodiments, the physical currency transaction acceptance sent by the second user may include a counter-offer to the first user. For example, if the physical currency transaction request includes a request by the first user to buy $2,000 of physical currency to be exchanged at a specified secure locker, the second user may respond with a counter offer to sell $1,500 of physical currency to be exchanged at the second user's desired location. In some embodiments, the first user may then have the ability to accept or reject the counter offer.

In some embodiments, the physical currency transaction acceptance may include sending a biometric scan. For example, the user account on the currency exchange client application 132, 232 may have a biometric scan, or multiple biometric scans, associated with the account. The biometric scan(s) may be stored on the currency exchange client application 132 and/or on the provider institution computing system 106. Further, a notification may be displayed within the currency exchange client application 132, 232 instructing the user to provide a biometric scan. This biometric scan, or the stored biometric scan, may be provided to the provider institution computing system 106 as a part of the physical currency transaction acceptance. This biometric scan may be tied to later steps of the process 300. For example, the biometric scan(s) may be used as a password to gain access to the exchange location, as is discussed further herein.

In certain other examples, biometric information or scans may be used to access secure information, passwords, keys, etc., on a user device. For example, biometric information or scans may be used to access secure information stored by a secure enclave. Once accessed, this secure information may be used to verify or validate an entity to one or more of the exchanges and/or transactions described herein. That is, in certain examples, biometric authentication may be leveraged without transmitting or communicating any biometric information of a user.

In some embodiments, any or all of process 302, process 304, process 305 and/or process 306 may be automated. For example, the first user device 104 and/or the second user device 204 may utilize an inventory tracking system as is discussed further below.

Process 307 includes initiating a payment request from the second user device 204 to the first user device 104. For example, the provider institution computing system 106 may initiate a payment request and provide the payment request to the currency exchange client application 232 of the second user device 204. The payment request serves to provide compensation to the first user associated with the currency exchange client application 132 in exchange for the physical currency being provided by the first user to the second user. For instance, if $1,000 of physical currency is to be exchanged, the payment request may be for a payment of $1,005. A first portion of the payment corresponding to the amount of the physical currency exchange (e.g., $1,000), and a second portion of the payment corresponding to a fee for completing the exchange (e.g., $5).

The specific amount of payment required in the payment request may be determined based on the currency exchange transaction parameters. For example, when the physical currency transaction request is made on the currency exchange client application 132, the first user may include in the request a currency exchange transaction parameter that specifies the amount of the payment, which is generally equal to or greater than the value of the physical currency that is going to be exchanged. The first user may also include a currency exchange transaction parameter that specifies payment terms, such as whether partial or full payment for the physical currency should occur before the physical currency is exchanged. Alternatively, the currency exchange transaction parameters may not require any payment before the physical currency is exchanged. In this example embodiment, the payment request may be completed at process 314, as is discussed further below.

The type of payment required in the payment request may be determined based on the currency exchange transaction parameters. The payment request may include a request to pay for the physical currency with a credit card, a stored value account (e.g., a prepaid card), cryptocurrency, or a wire transfer such as ACH, a P2P platform. In some embodiments, the second user may have a bank account maintained by the provider institution that may provide the funds for bidding on or purchasing the physical currency. In some embodiments, the currency exchange client application 132, 232 may allow a user to maintain credit on the user's account. This credit may be used to purchase the physical currency. For example, if the first user and the second user are using the same application that is operated by the provider institution, the first and second user may have credit associated with their respective accounts. For example, if the first user sells a first amount of physical currency to the second user, a credit substantially equal in value to the first amount of physical currency may be added to the first user's account. The credit received by the first user may be subtracted from the second user's account. That is, it may be subtracted from an account associated with an application on the second user device 204 and/or from any other account associated with the second user (e.g., a savings account with a provider institution, a checking account with a provider institution, a PayPal account, a Venmo account, etc.). The first user may then use this credit to purchase physical currency in the future (e.g., in a subsequent physical currency exchange transaction), and/or the first user may deposit the credit into any other account associated with the first user (e.g., a savings account with a provider institution, a checking account with a provider institution, a PayPal account, a Venmo account, etc.).

Process 308 includes determining an exchange location for the physical currency exchange. For example, the provider institution computing system 106 may determine an exchange location. The exchange location may be determined based on the currency exchange transaction parameters. For example, the physical currency transaction request submitted by the currency provider (e.g., first user) may include a currency exchange transaction parameter that requires the physical currency to be picked up from the currency provider's (e.g., first user's) current location. In this example, the provider institution computing system 106 determines the exchange location to be the currency provider's (e.g., first user's) current location. In another example embodiment, the physical currency transaction request submitted by the currency provider (e.g., first user) may include a currency exchange transaction parameter that requires the exchange location to be within a specified distance of the currency provider's (e.g., first user's) current location. In this example, the provider institution computing system 106 determines the exchange location to be within the specified distance of the currency provider's (e.g., first user's) current location. Further, in this example, the currency requestor's (e.g., second user's) physical currency transaction request may include a currency exchange transaction parameter that requires the exchange location to be within a specified distance of the currency requestor's current location. The provider institution computing system 106 may determine the exchange location to be an exchange location that satisfies both the currency provider's (e.g., first user's) and currency requestor's (e.g., second user's) currency exchange transaction parameters. In certain embodiments, the exchange location may be a local branch of the provider institution.

In certain embodiments, the provider institution computing system 106 may provide the user device 104, 204 with a plurality of potential exchange locations. For example, the currency exchange client application 132, 232 may launch a GUI that includes a list of all potential exchange locations. The list of potential exchange locations may be filtered and sorted based on the search criteria parameters, the currency exchange transaction parameters, the current location of the user devices 104, 204, the insurance limit of each exchange location, and/or any other distinguishing aspects of the potential exchange locations. In certain embodiments, the currency exchange client application 132, 232 may surface a map of each potential exchange location. The user may then select one or more of the potential exchange locations using the currency exchange client application 132, 232 highlight one or more of the depicted plurality of potential exchange locations.

In certain embodiments, the exchange location may be operated by a third party. For example, the exchange location may be a secure room controlled by the third party computing system 102. Further, a different third party (i.e., different from the third party that operates the exchange location) may operate a third party computing system 102 that may control lockers located within the secure room. In certain embodiments, process 308 includes the provider institution computing system 106 sending an availability inquiry request to the third party computing systems described above. For example, the provider institution computing system 106 may send an availability inquiry request to the third party computing system 102 to determine if lockers are available at a desired exchange location. In certain examples, lockers (or other secure containers, rooms, or storage units) are available when they are empty. The third party computing system 102 may send a reply to the inquiry indicating when a locker is available. If a specific locker is available, the provider institution computing system 106 may determine the exchange location, which includes the specific locker to be utilized for the currency exchange.

In some embodiments, the third party(s) hosting the exchange location must be registered with the provider institution. For example, the provider institution may require certain requirements (e.g., insurance, minimum security measures, 24/7 surveillance, etc.) before allowing the third party location to serve as a site for the physically currency exchange. By registering with the provider institution, secure communication between the provider institution computing system 106 and the third party computing system (s) 102 may be enabled.

In certain embodiments, the exchange locations may be insured up to a certain amount. In some embodiments, process 308 includes determining an exchange location based on the insurance limit of each potential exchange location. For example, if the first user submits a physical currency transaction request that includes a currency exchange transaction parameter that defines a first amount of physical currency to be exchanged, the provider institution computing system 106 may determine an exchange location that is insured up to at least the first amount of physical currency.

In some embodiments, once the exchange location for the physical currency exchange is determined, the provider institution computing system 106 may determine a password or other credential for the physical currency exchange. For example, if the physical currency exchange location is a secure room and/or a secure locker, the currency requestor (e.g., second user) may be required to enter a password to unlock the room or locker to obtain the physical currency. In some embodiments the password may be dynamic. That is, the password may be different for each physical currency exchange. In some embodiments, the provider institution computing system 106 may provide the password to the third party computing system(s) 102 that operates the secure room and/or secure locker. In certain embodiments, the password may be a biometric scan. For example, the second user device 204 that is operated by the cash requestor may take a biometric scan of the second user, such as a fingerprint scan, a facial scan, or a retinal scan, to name a few examples. The second user device 204 may then provide the biometric scan to the provider institution computing system 106, which may then provide the biometric scan to the third party computing system(s) 102 that is operating the secure room/ locker. The secure room/locker may include a biometric scanner connected to the third party computing system 102. In this example, the second user may unlock the secure room/locker by submitting a biometric scan at the exchange location. The third party computing system 102 may compare the biometric scan taken at the exchange location to the previously provided biometric scan. Or, the third party computing system 102 may transmit the received biometric information to the provider institution computing system 106 to authenticate/confirm the identity of the user based on identifying a match in the database.

In another embodiment, a token may be provided to the first and second user device. The third party computing system 102 may receive the token via a tap of the user devices to a short-range wireless receiver (e.g., a NFC transceiver). The token may be an authentication token generated by the client applications 132, 232 or by the provider institution computing system 106 and sent to the devices (e.g., a numeric or alphanumeric character string). The token may be a limited use token and expire after use or after a preset amount of time. In other words, the provider institution computing system 106 may generate a credential that expires after a preset amount of time such that the provider institution computing system 106 is configured to deactivate the credential from accessing the exchange location after the preset amount of time.

At process 309, currency exchange instructions are provided to the first user device 104 and second user device 204 (e.g., via the currency exchange client application 132, 232). The currency exchange instructions may be determined by the provider institution computing system 106, and/or the third party computing system 102, based on the currency exchange transaction parameters. The exchange instructions may also be provided to the third party computing system 102 and/or the provider institution computing system 106 via the network 108. The currency exchange instructions may also be received by the provider institution computing system 106 and/or any other devices connected to the network 108.

Information about each user's account on the currency exchange client application 132, 232 that was previously concealed from the other users may be revealed during this process (i.e., process 309). For example, if the physical currency transaction request made by a first user indicates that the first user was offering to sell $5,000 of physical currency to be picked up from the first user's place of business, the exact identity and location of the first user may have been hidden from the users that the physical currency transaction request was provided to. However, some or all of the concealed information (e.g., the address and identification of the first user) may be needed by the second user to complete the currency exchange. For example, the currency exchange instructions may include the location of the first user device 104 so that the second user can pick up the physical currency offered for sale by the first user.

Further, the third party computing system 102 and/or the provider institution computing system 106 may generate additional instructions for the physical currency exchange. For example, instructions may be added to specify the time, or time frame that the currency exchange should take place. The time of the exchange refers to when the currency exchange may occur. For example, a currency exchange transaction parameter may require the currency exchange to happen before a certain date, and after that certain date, the physical currency transaction request may expire. The location for the exchange refers to the location that the physical currency is to be transported to for exchange and may be based on the currency exchange transaction parameters and/or the current location of the user device used to submit the physical currency transaction request. In certain embodiments, a map may be surfaced on the currency exchange client application 132, 232 as a part of the currency exchange instructions. For example, the map may include directions to get to the exchange location.

In some embodiments, the third party computing system 102 and/or the provider institution operating the provider institution computing system 106 may provide users with a secure container used to contain the physical currency for the exchange. The secure container may also be connected to the network 108 so that the third party computing system 102 and/or the provider institution computing system 106 may be used to control and monitor various aspects of the secure container (e.g., location tracking such as GPS tracking, updating/changing a lock combination, monitoring the weight of the contents in the secured container, tracking times which the container is opened and/or closed, monitoring any security equipment, such as camera(s) and/or microphones built into the secured container, controlling an alarm built into the secure container, etc.). In some examples, the currency exchange instructions may include instructions on how to use the secure container (e.g., providing a combination code to unlock the container, a token like described above, biometric information of the users, etc.).

In some embodiments, the currency exchange instructions may include instructions for using a secured locker for the exchange of physical currency. For example, the provider institution operating the provider institution computing system 106 and/or the third party operating the third party computing system 102 may provide secure lockers at various locations around the world to be used in conjunction with the real-time currency exchange system. Alternatively, or additionally, secure lockers may be provided by another party.

In some embodiments, a group of lockers may be available at a given location managed or coupled to the third party computing system 102, allowing multiple currency exchanges to happen at the same location. In this example, the currency exchange instructions may include instructions for using a specific locker among the group of lockers. The lockers may have various security measures (e.g., locking mechanism, alarm, motion sensors, video cameras, etc.) that can be controlled remotely. The group of lockers may be connected to the network 108 so the provider institution computing system 106 may be used to control and monitor various aspects of the secure locker via communications or a secure connection (e.g., an API) with the third party computing system 102 (e.g., updating/changing a lock combination, monitoring the weight of the contents in the secured locker, tracking times which the locker is opened and/or closed, monitoring any security equipment, such as camera(s) and/or microphone(s) built into the secured locker, controlling an alarm built into the secure container, etc.). In certain embodiments, the secure lockers may be located within a building (e.g., inside a provider institution building, a bank branch, a police station, a securely monitored building, etc.). In some embodiments, the lockers may include a biometric reader (e.g., fingerprint scanner, face scanner, retina scanner, hand scanner, Iris recognition scanner, voice recognition, ear shape scanner, DNA matching, etc.). In some embodiments, each user account registered with the currency exchange client application may have a biometric profile associated with each user's account. In some embodiments, users may use the biometric reader to lock and unlock the secure lockers.

In some embodiments, the locker or group of lockers may be located near an ATM machine. The ATM machine may be operated by the provider institution operating the provider institution computing system 106. Therefore, if a currency requestor (e.g., second user) would like to purchase additional physical currency, the user may withdraw additional currency from the ATM. In some embodiments, the locker may also be located near a currency deposit box (e.g., a secured and locked drop off box) operated by a provider institution. Therefore, if a buyer only purchased a portion of the physical currency that the seller had for sale, the seller may place the remaining physical currency in the secure currency deposit box.

In some embodiments, the exchange location for the physical currency exchange may be located inside a locked secure room. The currency exchange instructions may include a passcode that may be used to unlock the secure room. The passcode may be dynamically produced by the provider institution computing system 106 and/or the third party computing system 102. Alternatively, or additionally, the users may be required to swipe or scan an ID card (i.e., a driver's license, a credit, a debit card, etc.) in order to unlock the secured room. The locked secure room may also include various scanners (e.g., RFID, NFC scanner, etc.) that may be used to scan various items of each user. In the example, the user device (e.g., first user device 104 and/or second user device 204) may be used to gain access to the secured room. Further, the scanner may scan a badge or identification card possessed by each user. Further, the currency exchange client application 132, 232 of the first user device 104 and/or the second user device 204 may be used to display a barcode (e.g., a QR code, a PDF417, Code 39, a Codabar, etc.) within the currency exchange client application 132, 232 that may be scanned by a scanner outside the secured room in order to unlock the secure room. The barcode may be dynamically created by the provider institution computing system 106 and/or the third party computing system 102 and sent to the first user device 104 or second user device 204. Further, a barcode may displayed on or near the secured locker/room, and scanning the barcode on the first user device 104 and/or the second user device 204 may unlock the secured locker or room. For example, the first user device 104 may scan the barcode, send confirmation that the barcode was scanned to the provider institution computing system 106 and/or the third party computing system 102, and the provider institution computing system 106 and/or the third party computing system 102 may remotely unlock the secured locker and/or the secured room. The locked secure room and/or all the scanners and other security measures (e.g., video cameras, microphones, motion sensors, etc.) may be connected to the network 108, so that the third party computing system 102 and/or the provider institution computing system 106 may monitor the secured room and/or update which users may be able to unlock the secure room.

In some embodiments, the currency exchange instructions may include instructions for a seller of physical currency to place different amounts of physical currency in multiple lockers of a plurality of various lockers. For example, a first user may submit a physical currency transaction request to sell $10,000 of physical currency on the currency exchange client application 132. A second user may submit a partial physical currency transaction acceptance on the currency exchange client application 232 of $4,000 physical currency, and a third user may place a partial physical currency transaction acceptance of $5,000. In this situation, the currency exchange instructions may include instructions to place $4,000 of physical currency into a first locker, $5,000 physical currency into a second locker, and $1,000 physical currency into a third locker. The $1,000 physical currency in the third locker may then remain in the third locker until a fourth user sends a physical currency transaction acceptance to purchase the $1,000 physical currency. In some embodiments, the fourth user may be the provider institution or third party that operates the secured locker. In this example, multiple users (e.g., the first and third user) may place various amounts in various lockers for a single user (e.g., the second user) to retrieve.

At process 310, a physical currency exchange confirmation is received from the first user device 104. For example, the currency exchange confirmation may be received by the provider institution computing system 106, and/or the second user device 204. The currency exchange confirmation may also be received from any other device (e.g., a smart locker, smart container, secured room, etc.) connected to the network 108.

The currency exchange confirmation may include an indication that the user has completed the currency exchange instructions. For example, if a first user is a currency provider, and the first user receives currency exchange instructions that include instructions to deliver $5,000 to a secured locker, the first user may use the I/O device 136 of the first user device 104 to send a currency exchange confirmation once the first user has placed the physical currency inside the secure locker. Alternatively, or in addition to, the currency exchange confirmation may be automatically sent. For example, the secure locker may have a sensor (e.g., weight sensor, camera, RFID sensor, etc.) within the secure locker that is capable of detecting when the physical currency has been delivered to the secured locker. Further, in some alternate embodiments, the currency may be deposited in a smart container that includes a money counting mechanism (e.g., scale, bill counting machine, etc.). In this example embodiment, the currency exchange confirmation may be automatically sent, for example, once the secured locker has been locked with the physical currency located inside. Further, the currency may be deposited in a smart container that includes a money counting mechanism (e.g., scale, bill counting machine, etc.). In this example embodiment, the currency exchange confirmation may be automatically sent once the physical currency has been received by the secured container.

In another example, the currency exchange confirmation may be automatically sent by the first user device 104 and/or by a secured container. For example, if the first user is a currency provider and the currency exchange instructions include instructions to deliver $5,000 to a second user, the currency exchange confirmation may be automatically sent once a location device (e.g., a GPS) indicates that the first user device 104 and/or the secured container has arrived at the second user's location.

In another example, the currency exchange confirmation may be sent by a third party on behalf of the first user. For example, if the first user is a currency provider and the currency exchange instructions include instructions to deliver $5,000 to a third party, the third party may send the currency exchange confirmation once the first user has delivered the physical currency to the third party.

At process 312, a physical currency exchange confirmation is received from the second user device 204. For example, the currency exchange confirmation may be received by the first user device 104 and/or the provider institution computing system 106. The currency exchange confirmation may be received from the second user device 204 via the network 108. The currency exchange confirmation may also be received from any other device (e.g., a smart locker, smart container, secured room, etc.) connected to the network 108.

In another example, the currency exchange confirmation may be automatically sent by the second user device 204 and/or by a secured container used to transport physical currency. For example, if the second user is a currency requestor and the currency exchange instructions include instructions to retrieve $5,000 from the first user, the currency exchange confirmation may be automatically sent once a location device (e.g., a GPS) indicates that the second user device 204 arrives at the first user's location. Alternatively, or in addition to, the currency exchange confirmation may be automatically sent the by the secured container once a location device (e.g., a GPS) indicates that the secured container has left the first user's location and/or arrived at the second user's location.

In another example, the currency exchange confirmation may be sent by a third party (e.g., a courier) on behalf of the second user. For example, if the second user is a currency requestor and the currency exchange instructions include instructions to retrieve $5,000 from a third party (e.g., a courier), the third party may send the currency exchange confirmation once the second user has retrieved the physical currency from the third party (i.e., the courier has delivered the physical currency).

At process 314, the payment request from the second user device 204 to the first user device 104 is completed. For example, if only a partial payment, or no payment was required by the currency exchange transaction parameters at process 307, the remainder of the payment may be completed at process 314.

In some embodiments, process 314 may be omitted. For example, if full payment was required by the currency exchange transaction parameters at process 307, then process 314 may be omitted. Alternatively, one of the users may be a charity that is seeking donations. In this example, the first user may be a currency provider, and would like to make a donation to the charity. The charity may be the first user and make a physical currency transaction request including a request for any amount of physical currency. The charity may be the second user and send in a currency confirmation to any physical currency transaction request that includes a request that the second user is a charity organization. Since the currency exchange is a donation, the payment request may not be required.

At process 316, a transaction rating is received from the first user device 104 (e.g., via the currency exchange client application 132). For example, the transaction rating may be received by the second user device 204 and/or the provider institution computing system 106. The transaction rating may be received from the first user device 104 via the network 108. It should be appreciated that process 316 may be omitted. Further, process 316 may be performed before process 312 and/or process 314.

In some embodiments, a transaction rating system may be utilized in the real-time currency exchange system 100. For example, each user account may be assigned an account rating (e.g., a sliding scale rating system from 1-5 stars where 5 stars represents an account with an excellent reputation and 1 star represents an account with a poor reputation). The rating associated with each account may be determined using any combinations of available parameters associated with each user (e.g., credit rating, number of currency exchanges completed, percentage of failed transactions, etc.). Alternatively, or additionally, the rating associated with each account may be based on peer review. For example, after a physical currency exchange has been completed, the users involved in the transaction may be given the opportunity to review the transactions. The users may consider factors such as promptness of communication with other user, accuracy of the other user's statements, politeness of the other party, etc.

The transaction rating may include feedback from the first user regarding the first user's experience during the real-time currency exchange process 300. In some embodiments, the transaction rating may include an evaluation of the second user's performance during the real-time currency exchange process 300. For example, the first user may submit an account rating for the second user (e.g., a sliding scale rating system from 1-5 stars where 5 stars represents an account with an excellent performance and 1 star represents an account with a poor performance). The first user may consider factors such as promptness of communication with the second user, accuracy of the second user's statements, politeness of the second user, etc. Further, the transaction rating may include any complaints or concerns that the first user may have (e.g., the second user never delivered the physical currency, there was not as much physical currency delivered as was agreed upon, etc.). In some embodiments, disputes may be sent to the third party computing system 102, the and/or the provider institution computing system 106, at which point they may be investigated and handled by the parties operating the computing systems.

At process 318, a transaction rating is received from the second user device 204 (e.g., via the currency exchange client application 232). For example, the transaction rating may be received by the first user device 104, the provider institution computing system 106. The transaction rating may be received from the second user device 204 via the network 108. Process 318 may be similar to process 316. It should be appreciated that process 318 may be omitted. Further, process 318 may be performed before process 310, process 314, and/or process 316. Further, process 316 and 318 may be completed simultaneously.

Each user may have a rating associated with the user's account associated with the user's account on the currency exchange client application (e.g., the currency exchange client applications 132, 232). The rating may be a cumulative score based on ratings submitted by other users. The rating for each account may be determined using any combinations of available parameters associated with each user (e.g., credit rating, number of currency exchanges completed, percentage of failed transactions, etc.). A user's rating may further be a search criteria parameter used to find physical currency transaction requests. For example, a user may only wish to accept physical currency transaction request from users with a high user rating (e.g., at least 4 out of 5 starts). In certain embodiments, users with sufficiently low ratings may be prevented from participating in any currency exchanges.

In some embodiments, the currency exchange client application 132, 232 may maintain an inventory of physical currency. For example, the currency exchange client application 132, 232 may actively track the inventory of physical currency at a specified location. Alternatively, or additionally, inventory may be tracked by the provider institution computing system 106 such that the inventory may be accessed by the currency exchange client application 132, 232. For example, if the user operates and/or manages a retail store, the provider institution computing system 106 may track all the transactions made at the retail store. By tracking the payment method used (e.g., debit card, credit card, check, etc.), the total payments made, and the change given to customers, the provider institution computing system 106 may be able to provide a real-time inventory of physical currency located at the retail store. The user may select an upper threshold (i.e., a currency provider threshold) and a lower threshold (i.e., a currency requestor threshold), or an upper threshold and lower threshold may be set automatically by the currency exchange client application 132, 232. If the total amount of physical currency at the retail store exceeds the upper threshold, a physical currency transaction request offering to sell physical currency may be automatically generated and sent. If the total amount of physical currency at the retail store drops below the lower threshold, a physical currency transaction request to purchase physical currency may be automatically generated and sent.

In some embodiments, the real-time currency exchange process 300 may be used to exchange different types of currency (e.g., trading US dollars for euros). For example, a currency requestor (e.g., second user) may traditionally use US dollars and make a physical currency transaction request to purchase euros. In this example embodiment, a currency provider (e.g., first user) may accept the currency requestor's (e.g., second user's) offer to purchase euros. The currency provider (e.g., first user) may then provide euros to the cash requestor in exchange for an electronic payment that is substantially equal to the euros that are provided. The electronic payment does not necessarily need to be in euros, and can instead be a substantially equal value of US dollars. Further, the cash providers may bid on the cash requestors request to purchase euros as discussed above.

Figure 3:
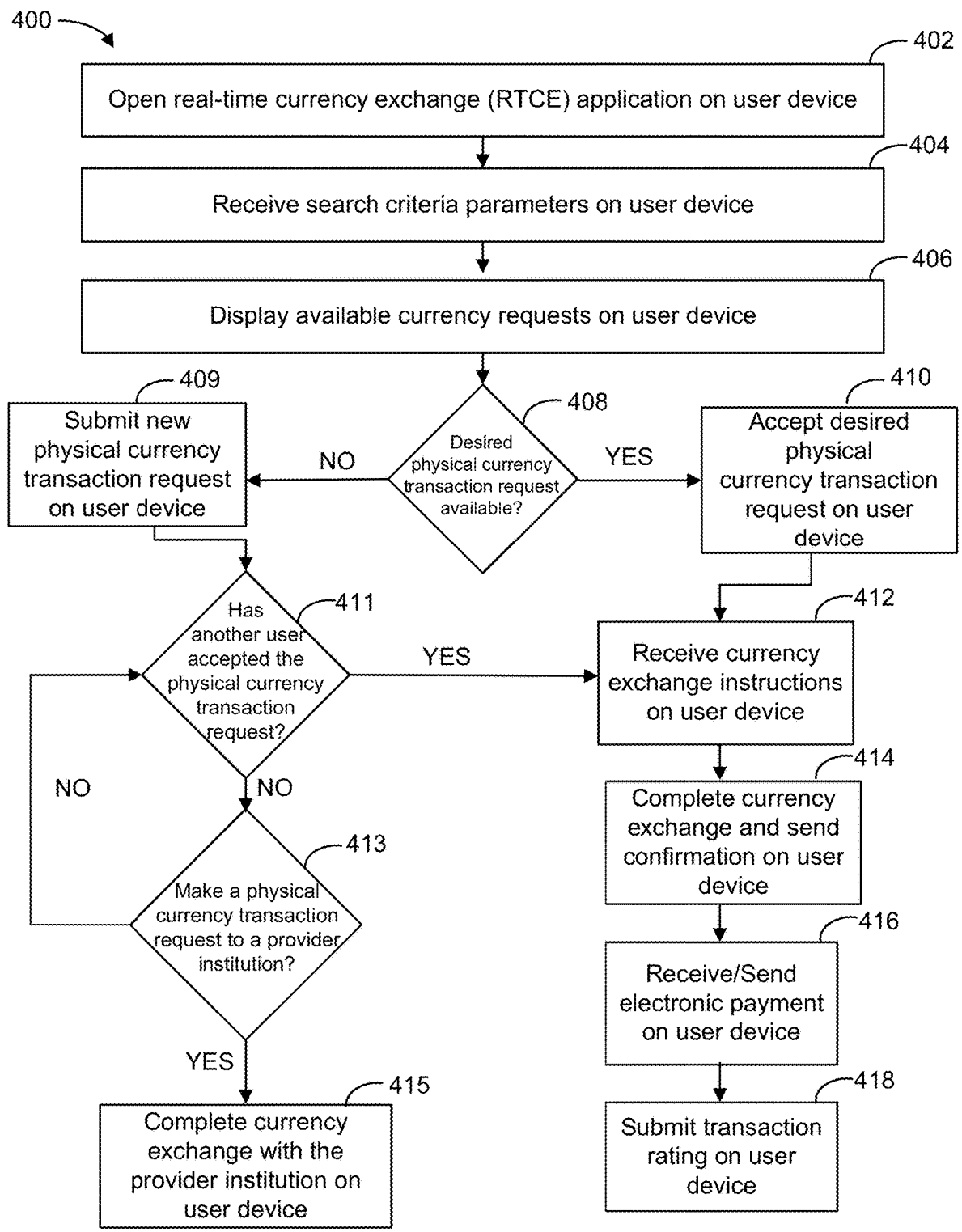
FIG. 3 is a flow diagram of a currency exchange process using, at least in part, the system of FIG. 1, according to another example embodiment.

Referring now to FIG. 3, a flow diagram of a real-time currency exchange process 400 is shown according to an example embodiment. The process 400 may be implemented with the system 100 such that reference may be made to the system 100 or components thereof to explain process 400.

At process 402, a real-time currency exchange (RTCE) application (e.g., the currency exchange client application 132, the currency exchange client application 232) is opened on a user device. For example, a first user may open the RTCE application 132 on the first user device 104 (e.g., a phone, tablet, laptop, desktop computer, etc.).

Process 402 may require the user to securely login to the RTCE application 132. For example, the user may be required to enter a username and password to use the RTCE application 132. The user may additionally, or alternatively, provide a biometric scan and/or complete a two-factor authentication to login to the RTCE application 132. The method of login may also be tied to various parts of the real-time currency exchange process 400. For example, if the user participates in a biometric scan (e.g., fingerprint scan), the same biometric scan may be required to open a secured container, open a secured locker, and/or open a secured building/room during the exchange of the physical currency. In some examples, the biometric data, and any other secure login information, may be shared with various components of the real-time currency exchange system via the network 108. In other examples, the biometric data, and any other secure login information, may be used to unlock secure information on the user's device. The secure information may then be shared with various components of the real-time currency exchange system via the network 108.

At process 404, search criteria parameters are received by the RTCE application 132 on the first user device 104. A GUI may be generated within the RTCE application 132 with fields that may be filled in by the first user with search criteria parameters. The search criteria parameters may specify whether the user is a currency provider (i.e., offering to sell physical currency) or a currency requestor (i.e., offering to buy physical currency). The search criteria parameters may be compared to the currency exchange transaction parameters included in available physical currency transaction requests. For example, if the user indicates on the RTCE application 132 that the user (e.g., first user) is a currency provider, physical currency transaction requests submitted by other users offering to purchase physical currency may be displayed to the first user on the first user device 104 via the currency exchange client application 132.

If the user indicates on the RTCE application 132 that the user (e.g., second user) is a currency requestor, physical currency transaction requests submitted by other users offering to sell physical currency may be displayed to the first user on the first user device 104. In this example, the RTCE application 132 may further filter the physical currency transaction requests being displayed by using further search criteria parameters. For instance, these further search criteria parameters may include criteria that the physical currency must be delivered to the second user, the seller must be willing to sell at least $3,000 of physical currency, the seller must be willing to sell at least $500 of US $1 bills, the currency exchange method must be a wire transfer, and/or the currency exchange method must be a credit transfer on an application managed by the third party computing system.

At process 406, available currency requestors and/or currency providers may be displayed on the RTCE application 132, 232 of the user devices. For example, GUI may be launched within the RTCE application 132, 232 that displays the available physical currency transaction requests corresponding to the various currency requestors and/or currency providers. For example, a list of currency requestors may be provided to a currency provider (e.g., first user), and a list of currency providers may be displayed for a currency requestor (e.g., second user). For example, once the first user has entered the desired search criteria parameters into the RTCE application 132, multiple physical currency transaction requests may be displayed to the first user via the currency exchange client application 132 of the first user device 104. The multiple physical currency transaction requests may be displayed within the RTCE application 132 to the first user in a variety of ways. For example, a list may be displayed including all physical currency transaction requests that fulfill the first user's desires. The first user may then use the RTCE application 132 to sort the list according to various parameters (e.g., distance to the user that made the currency request, rating of the user that made the currency request, users that are willing to deliver physical currency, etc.).

In another example, a map may be surfaced from within the RTCE application 132. The map may be stored in the application or generated and provided via a map application on the user device that is provided via one or more APIs or SDKs in the RTCE application 132. The map may show (e.g., via one or more icons, shapes, images, or text on the map) the location, or relative location, of the currency exchange location requested in the various corresponding physical currency transaction requests. For example, a map may be launched on a RTCE application 132, 232 in response to a physical currency request being input into the user device. If a currency requestor (e.g., second user) makes a physical currency transaction request, a map may be displayed within the RTCE application 132, 232 that shows some or all of outstanding currency provider offers. Several physical currency transaction requests may be displayed to the first user one at a time. For example, the most relevant currency requests (based on the search criteria entered, the currency exchange transaction parameters, etc.) may be displayed first. The first user may then indicate whether they are interested in the physical currency transaction request via the RTCE application 132 of the first user device 104. For example, if the I/O device 136 includes a touch screen, the first user may swipe directionally on the touch screen of the GUI of the RTCE application 132 to accept the physical currency transaction request, or the first user may swipe in a different direction on the touch screen to decline the currency request. If the first user declines the physical currency transaction request on the RTCE application 132, another physical currency transaction request may be provided to the first user. In this way, the user may "cycle" through all available, and matching, physical currency transaction requests. In some examples, the most relevant (e.g., based on matching parameters) requests may be provided first to the user, and as the user "cycles" through all available requests, the remaining requests are displayed in an order of decreasing relevance. It should be appreciated that this list of examples is not exhaustive and the physical currency transaction requests may be displayed to the first user by any means.

At decision 408, a selection is indicated on the user device via the RTCE application 132 based on whether or not a desirable physical currency transaction request is available. For example, during or after completing process 406, the first user may find a physical currency transaction request that is desirable (i.e., matches some or all of the first users search criteria parameters and/or business needs). If the first user finds a desirable currency request, the first user may select the request via the RTCE application 132 (process 410). For example, the first user may accept the desired physical currency transaction request using the RTCE application 132. If the first user is unable to find a physical currency transaction request that is desirable on the RTCE application 132 (e.g., none of the requests match some or all of the first users search criteria parameters and/or business needs), the first user may proceed to process 409, and submit a new physical currency transaction request on the RTCE application 132.

At process 409, a physical currency transaction request may be submitted on the first user device 104. For example, a GUI may be launched within the RTCE application 132 with fields that may filled in (e.g., to set currency exchange transaction parameters). The first user may then submit the physical currency transaction request using the RTCE application 132 to the provider institution computing system 106, as described above with respect to process 302.

Returning to process 410, a desired physical currency transaction request is accepted on a user device via the RTCE application 132, 232. In an example embodiment, the physical currency transaction acceptance may include a partial or complete acceptance of a physical currency transaction request made by the currency provider (e.g., first user). For example, if the physical currency transaction request included an offer to sell and deliver $5,000 of physical currency, the currency requestor (e.g., second user) may offer to purchase $3,000 of physical currency from the currency provider (e.g., first user), to be delivered by the currency provider (e.g., first user) or a third party. In some embodiments, the currency provider (e.g., first user) may have the ability to reject any partial or complete acceptances of physical currency transaction requests on the RTCE application 132, 232.

In some embodiments, process 410 may include sending a counter-offer to the user that made the physical currency transaction request. A GUI with fields may be generated within the RTCE application 132, 232 such that the user may provide information to fill the fields, such as a counter-offer. The counter-offer may be sent directly to the other user devices (e.g., the RTCE application 232 of the second user device 204) or to the provider institution computing system 106. If the counter is sent to the provider institution computing system 106, the provider institution computing system may be an arbiter between the two users. For example, if the physical currency transaction request includes a request by the currency requestor (e.g., second user) to buy $2,000 of physical currency to be exchanged at a specified secure locker, the currency provider (e.g., first user) may respond with a counter offer to sell $1,500 of physical currency to be exchanged at the currency provider's (e.g., first user's) place of business. In some embodiments, the currency requestor (e.g., second user) may then have the ability to accept or reject the counter offer.

In certain embodiments, the RTCE application 132 may prompt the user for a biometric scan and/or a passcode based on the acceptance of one of the plurality of physical currency exchange requests. For example, the first user device 104 may receive instructions from the provider institution computing system 106 to prompt the user for a biometric scan and/or a passcode. Once the RTCE application 132 receives the biometric scan and/or the passcode (i.e., the user inputs the biometric scan and/or the passcode), the first user device 104 may send the biometric scan and/or passcode to the provider institution computing system 106. The provider institution computing system 106 may then authenticate the biometric scan or the passcode. For example, the account database 146 of the provider institution computing system 106 may store a previously submitted biometric scan(s) and/or passcode(s) for with each user's account associated with the RTCE application. Further, the RTCE application 132 may store the previously submitted biometric scan(s) and/or passcode(s) for with the first user's account. The provider institution computing system 106 or the RTCE application 132 may then compare the newly received biometric scan and/or passcode to the stored biometric scan and/or passcode to authenticate the newly submitted biometric scan and/or passcode. In some embodiments, the provider institution computing system 106 may then provider currency exchange instructions including a secure exchange location based at least on the currency exchange transaction parameters and the search criteria parameters in response to authenticating the biometric scan.

At process 412, currency exchange instructions are received on a user device. For example, the RTCE application 132 may receive currency exchange instructions via the network 108. For example, the provider institution computing system 106 may provide currency exchange instructions to the first user device 104 via the network 108. Process 412 may be the same or similar as process 309 described above with reference to FIG. 2.

At process 414, the currency exchange is completed and confirmation is sent via the RTCE application 132. For example, the first user may complete the currency exchange instructions, and then the first user may send the currency exchange confirmation using the RTCE application 132 of the first user device 104. Similarly, the second user (i.e., the second party to the currency exchange transaction) may submit a confirmation through the RTCE application of the corresponding user device. Confirmations may be received by the provider institution computing system 106. In some examples, transfer of payment to a currency provider (e.g., first user) (or partial payment) may be conditioned on receipt of confirmation from both parties to the physical currency exchange transaction. That is, in some examples, payment is only transferred to the currency provider (e.g., first user) once it has been confirmed that the currency exchange has been completed. It should be appreciated that process 416 may be omitted in some examples. Process 414 may be the same or similar as process 310 and/or 312 described above with reference to FIG. 2.

At process 416, electronic payment is sent to or initiated by the RTCE application 132. For example, if the first user is selling physical currency (i.e., a currency provider), an account operated by the first user (e.g., an account on the RTCE application on the first user device 104, an account with the provider institution, an account with a third party, etc.) may receive an electronic currency transfer. Alternatively, if the first user is purchasing physical currency (i.e., a currency requestor), the first user may send an electronic payment. The "electronic currency transfer" is an electronic payment from the currency requestor (e.g., second user) to the currency provider (e.g., first user) for the physical currency. The amount is defined by the currency exchange transaction parameters such that the amount may include payment for the physical currency, delivery fees, and/or service fees (and any other fee(s)). Process 416 may be the same or similar as process 307, process 312, and/or process 314 described above with reference to FIG. 2.

At process 418, a transaction rating is submitted on the RTCE application 132. For example, a GUI may be launched within the RTCE application 132 with fields that the user may fill with information. For example, the first user may submit a transaction rating using the first user device 104. As discussed herein, various aspects of the physical currency exchange transaction may be rated, and the rating may be associated with an account of the parties to the currency exchange transaction. For example, the provider institution computing system may receive the transaction rating from the first user device 104 via the network 108, and associate that rating with the appropriate user. Ratings may be cumulative over the course of multiple transactions, and an average rating may be made available (e.g., viewable) for each user. In certain examples, ratings may be separate for currency providers and currency requestors. That is, a user may have two ratings (e.g., a requestor rating and a provider rating) if that user that both provides physical currency and requests physical currency. In certain examples, ratings may also be received by the second user device 204 to the transaction, and/or any other devices connected to the network 108. It should be appreciated that process 418 may be omitted in some examples. Process 418 may be similar or the same as process 316 and/or process 318 described above with reference to at least FIG. 2.

Returning to decision 411, an input is received by the RTCE application 132 based on whether another user has accepted the physical currency transaction request submitted at process 409. For example, decision 411 may be made by the provider institution computing system 106, and may inquire whether another party has sent a physical currency transaction acceptance in response to the physical currency transaction request submitted. If another user has accepted the physical currency transaction request, then the real-time currency exchange process 400 may proceed to process 412. If another user has not accepted the currency request, the real-time currency exchange process may proceed to decision 413.

Decision 411 may further include other users bidding on the physical currency transaction request submitted. In certain embodiments, the RTCE application 132, 232 may further include a GUI for a bidding interface with fields that may be filled in by the currency provider (e.g., first user) with currency exchange transaction parameters that define characteristics of the bidding. For example, a currency requestor (e.g., second user) may place a bid or multiple bids on physical currency transaction requests made by currency providers. In this example, multiple currency requestors may place bids on the same physical currency transaction request (e.g., to provide physical currency) made by a currency provider (e.g., first user). Thus, the currency provider (e.g., first user) may receive multiple offers to purchase currency from various currency requestors. In certain embodiments, the currency provider (e.g., first user) may accept the highest bid after a period of time, which may be determined based on the currency exchange transaction parameters in the physical currency transaction request.

In some embodiments, a minimum bid may be defined by the currency exchange transaction parameter. The minimum bid may include the minimum price at which a physical currency provider (e.g., first user) will accept a currency exchange transaction. Further, a bidding time period may be defined by the currency exchange transaction parameter. In certain embodiments, decision 411 may include determining whether a minimum bid has been placed within the bidding time period. If so, the real-time currency exchange process may proceed to process 412. If not, the real-time currency exchange process may proceed to decision 413.

At decision 413, it is determined whether the user would like to make a physical currency transaction request to a provider institution. For example, a GUI may be launched within the RTCE application 132 that enables the user to select whether the user would like to make a physical currency transaction request to a provider institution. If no physical currency transaction request is submitted, the real-time currency exchange process 400 reverts back to 411, and the user may choose to wait as long as the user would like for another user to accept the physical currency transaction request made at process 409. However, if the user would like to make a currency exchange with a provider institution, the real-time currency exchange process will proceed to process 415.

At process 415, a currency exchange is completed with a provider institution. For example, the RTCE application 132 of the first user device 104 may receive instructions to transport the physical currency to a local branch of the provider institution. The local branch may then hold the physical currency until another user accepts the physical currency transaction request. Alternatively, the provider institution may contact the first user to complete the currency exchange, and the real-time currency exchange process 400 may proceed to process 412, and the second user involved in the currency exchange will be the provider institution. Alternatively, the first user device 104 may receive instructions to transport the physical currency to a third party location (e.g., a secured room, secure locker, etc.) where the physical currency may be held until another user accepts the physical currency transaction request.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include physical currencies, non-physical currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method processes, it is understood that the order of these processes may differ from what is depicted. For example, two or more processes may be performed concurrently or with partial concurrence. Also, some method processes that are performed as discrete processes may be combined, processes being performed as a combined process may be separated into discrete processes, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching processes, correlation processes, comparison processes and decision processes.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a network interface circuit configured to facilitate data transmission over a network; and
a processing circuit comprising one or more processors coupled to non-transitory memory, wherein the processing circuit is configured to:
receive a first physical currency transaction request from a first user device, wherein the first physical currency transaction request includes a first currency exchange transaction parameter;
receive secure information from the first user device, the secure information being stored in a secure enclave processor of the first user device, wherein the secure information is accessed by the first user device using one or more private keys that are unique to the first user device;
receive a second physical currency transaction request from a second user device, wherein the second physical currency transaction request includes a second currency exchange transaction parameter;
match the first physical currency transaction request and the second physical currency transaction request based at least in part on the secure information, the first currency exchange transaction parameter, and the second currency exchange transaction parameter;
provide a biometric scan request to the second user device in response to matching the first physical currency transaction request and the second physical currency transaction request;
receive a biometric scan from the second user device in response to the biometric scan request;
verify the biometric scan as being associated with a user associated with the second user device;
determine a physical currency transaction acceptance based at least in part on the verified biometric scan;
determine an exchange location based at least in part on the first currency exchange transaction parameter and the second currency exchange transaction parameter, wherein the exchange location includes a locked area or a locker;
provide the biometric scan to the exchange location to enable access to the exchange location; and
provide a currency exchange instruction to the first user device and the second user device to facilitate an exchange of a first amount of physical currency.

2. The system of claim 1, wherein the processing circuit is further configured to identify the exchange location from a plurality of potential exchange locations based on the identified exchange location being within a geo-fenced area based on a current location of the first and second user devices.

3. The system of claim 1, wherein the processing circuit is further configured to:

provide a biometric scan request to the second user device in response to matching the first physical currency transaction request and the second physical currency transaction request;

receive a first biometric scan from the second user device in response to the biometric scan request;

verify the biometric scan as being associated with a user associated with the second user device;

determine a physical currency transaction acceptance based at least in part on the verified biometric scan; and receive a second biometric scan from the exchange location to authenticate the first biometric scan.

4. The system of claim 1, wherein the first currency exchange transaction parameter includes at least one of a desired physical currency amount, a set amount of denominations for the desired physical currency amount, or a time for delivery or pickup of the physical currency.

5. The system of claim 1, wherein the processing circuit is further configured to determine a physical currency transaction acceptance based at least in part on a passcode received from the second user device.

6. The system of claim 1, wherein the currency exchange instructions provided to the second user device include instructions to place a second amount of physical currency in a first locker and a third amount of physical currency in a second locker.

7. The system of claim 1, wherein the locker includes at least one locker in a plurality of lockers, wherein the processing circuit is further configured to receive availability information regarding the plurality of lockers, identify the at least one locker from the plurality of lockers based on at least one of the first or second currency exchange transaction parameters or the availability information, and reserve the identified at least one locker for the exchange.

8. The system of claim 7, wherein providing the currency exchange instructions further includes generating and providing a map to the first and second user devices that displays directions to the identified at least one locker.

9. The system of claim 1, wherein the processing circuit is configured to unlock the locked area or the locker based on receiving a matching biometric scan within a preset amount of time.

* * * * *